US006870651B2

(12) United States Patent
Tutt et al.

(10) Patent No.: US 6,870,651 B2
(45) Date of Patent: Mar. 22, 2005

(54) APPARATUS AND METHOD FOR GENERATING A DYNAMIC IMAGE

(75) Inventors: Lee W. Tutt, Webster, NY (US); Jason E. Anderson, Churchville, NY (US); Mitchell S. Burberry, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/449,347

(22) Filed: May 30, 2003

(65) Prior Publication Data

US 2004/0240013 A1 Dec. 2, 2004

(51) Int. Cl.[7] ................................................ G03H 1/04
(52) U.S. Cl. ............................ 359/35; 359/28; 359/30
(58) Field of Search ............................ 359/23, 28, 30, 359/35

(56) References Cited

U.S. PATENT DOCUMENTS

| | | | |
|---|---|---|---|
| 4,082,415 A | * | 4/1978 | Brooks et al. ................. 359/20 |
| 4,959,284 A | | 9/1990 | Smothers et al. |
| 5,236,808 A | | 8/1993 | Smothers |
| 5,949,559 A | * | 9/1999 | Kihara et al. .................. 359/23 |
| 6,185,018 B1 | | 2/2001 | Kihara |
| 6,377,371 B1 | | 4/2002 | Baba et al. |
| 6,400,474 B2 | * | 6/2002 | Shirakura ..................... 359/23 |
| 6,747,770 B2 | * | 6/2004 | Kihara ......................... 359/23 |

OTHER PUBLICATIONS

Kihara et al., Personalized Hologram, *IS&T's 2001 PICS Conference Proceedings*, pp. 22–25.

* cited by examiner

Primary Examiner—Leo Boutsikaris
(74) Attorney, Agent, or Firm—Thomas H. Close

(57) ABSTRACT

Apparatus for generating a dynamic image includes a laser light source for generating a coherent beam of light; optics for separating the light beam into a reference beam and an object beam; a lenslet light modulator, including an array of lenslets and a pixilated light modulator having a plurality of light modulating pixels associated with each lenslet in the array, the lenslet light modulator being located to modulate the object beam; image processing electronics for driving the lenslet light modulator with dynamic image data to produce a dynamic image at a recording plane; and optics for interfering the dynamic image and the reference beam at the recording plane to produce a hologram of the dynamic image in a holographic recording medium located in the recording plane.

21 Claims, 3 Drawing Sheets

APPARATUS AND METHOD FOR GENERATING A DYNAMIC IMAGE

FIELD OF THE INVENTION

The present invention relates to multiview imaging methods, and more particularly to the generation of holographic dynamic images.

BACKGROUND OF THE INVENTION

As used herein, a dynamic image is a recording that includes multiple separate images viewable from separate angles. Dynamic image can also include a recording of an optical element such as a lens or filter that exhibits different angular and intensity light modulations at different locations on the recording. A dynamic image may produce a motion image that is viewed by moving the angle of viewing to see a succession of image frames in a motion image sequence. A dynamic image can produce a depth image if each eye of a viewer receives different images of a stereo pair of images. Alternatively, a dynamic image may display a plurality of unrelated images viewable from different angles.

Holography has been used for generating dynamic images. The original method for making a white light hologram involved splitting a coherent light beam into two beams and illuminating an object with one of the beams. The scattered light from the object was then interfered with the second beam from opposite sides of a recording medium. To interfere the light, the beams must cover the same size. These size constraints and the need for the object to be illuminated has prevented the widespread use of holographic imaging. Various holographic recording media such as chromated gelatin, a photosensitive polymer-monomer mix, or a silver halide emulsion are known in the art.

One method of making a dynamic image hologram is disclosed in Personalized Hologram, by Kihara et al., IS&T's 2001 PICS Conference Proceedings, pp. 22–25. U.S. Pat. No. 5,949,559 issued Sep. 7, 1999 to Kihara et al. further describes a printer apparatus and method for making the dynamic image holograms. The data for driving the printer is generated as described in U.S. Pat. No. 6,377,371 issued Apr. 23, 2002 to Baba et al.

The process disclosed by Kihara et al. is shown in FIG. 1. A laser beam 30 from laser 10 is reflected from mirror 20, and split into two beams with beam splitter 40. The beams are made uniform with a spatial filter 50. One of the beams is focused through cylindrical lens 60 to a line which impinges on the holographic recording medium 90. The holographic recording medium 90 is attached to a linear translation stage 100 which allows the medium to be moved perpendicular to the long axis of the cylindrical lens 60 while maintaining focus. The other beam on the obverse side of the holographic recording medium 90 is collimated, passed through the pixilated light modulator 70, and focused to a line with cylindrical lens 60. The pixilated light modulator 70 is controlled by computer 110, which includes processing electronics for modulating individual pixels of the pixilated light modulator. The focused line from the beam which passed through the pixellated light modulator 70, hereafter called the object beam 44, is focused on a diffuser 80 which is in close proximity to the focused line of light from the obverse side, hereafter called the reference beam 42. The light from the two lines of focused light interfere and the holographic recording medium 90 records that information for all the angles around that line. The holographic recording medium 90 is translated and the process is repeated for the next line until complete.

The holographic recording medium 90 is developed or otherwise processed to generate an interference pattern which can be viewed. To view the images, an incoherent light source irradiates the medium from nearly the same angle as the reference beam's angle to the medium and the diffracted light can then be observed by a viewer.

One of the problems encountered by Kihara et al. was generating a uniform beam; in U.S. Pat. No. 6,185,018 issued Feb. 6, 2001, they describe using condensing lenses, lenslet arrays, and lenticular arrays with a rod type light integrator to give a uniform object beam. In a typical white light line hologram, the hologram is written a line at a time. White light refers to the type of hologram which has the reference on the opposite side from an object beam, it is referred to as a white light hologram because it is viewable under white incoherent light. The object beam has information encoded into it by reflecting off an object or being passed through or off a pixilated light modulator. The pixilated light modulator is a device which changes the light in an incident beam spatially. An LCD display is an example of a pixilated light modulator since it changes the light passing through it on a pixel by pixel basis (spatially changes it). The focusing of the modulated object beam to a line turns pixels in the focus direction into pixel information coming out at an angle as shown in FIG. 1. In the perpendicular direction, the cylindrical lens used to focus to a line has no power and so the pixels in that direction correspond to an image line.

To generate a line hologram image, a line is written which contains one line of image for each image desired wherein each different image line is projected at a different angle. To generate the complete images, the process is repeated to form a complete image at different angles. Some consideration is necessary of the viewing distance because if a close view distance is desired, the angles for a specific images line will have to vary from the top to the bottom of the media to ensure the viewer's eye receives only the one image.

In the case of a full hologram, instead of using a cylindrical lens to focus to a line, a regular lens is used to focus to a point. In this case, all pixels on the modulator correspond to different angles and a single pixel from an image. This yields a full holographic reproduction from all angles but since the image is written a point at a time, the time to write a line can be substantial.

There is a need therefore for an improved method of making holographic images that avoids the problems noted above.

SUMMARY OF THE INVENTION

The need is met according to the present invention by providing apparatus for generating a dynamic image including a laser light source for generating a coherent beam of light; optics for separating the light beam into a reference beam and an object beam; a lenslet light modulator, including an array of lenslets and a pixilated light modulator having a plurality of light modulating pixels associated with each lenslet in the array, the lenslet light modulator being located to modulate the object beam; image processing electronics for driving the lenslet light modulator with dynamic image data to produce a dynamic image at a recording plane; and optics for interfering the dynamic image and the reference beam at the recording plane to produce a hologram of the dynamic image in a holographic recording medium located in the recording plane.

ADVANTAGES

The present invention has the advantage of producing a dynamic image hologram in a much shorter time than the prior methods and apparatus.

DETAILED DESCRIPTION OF THE INVENTION

Figure 1:
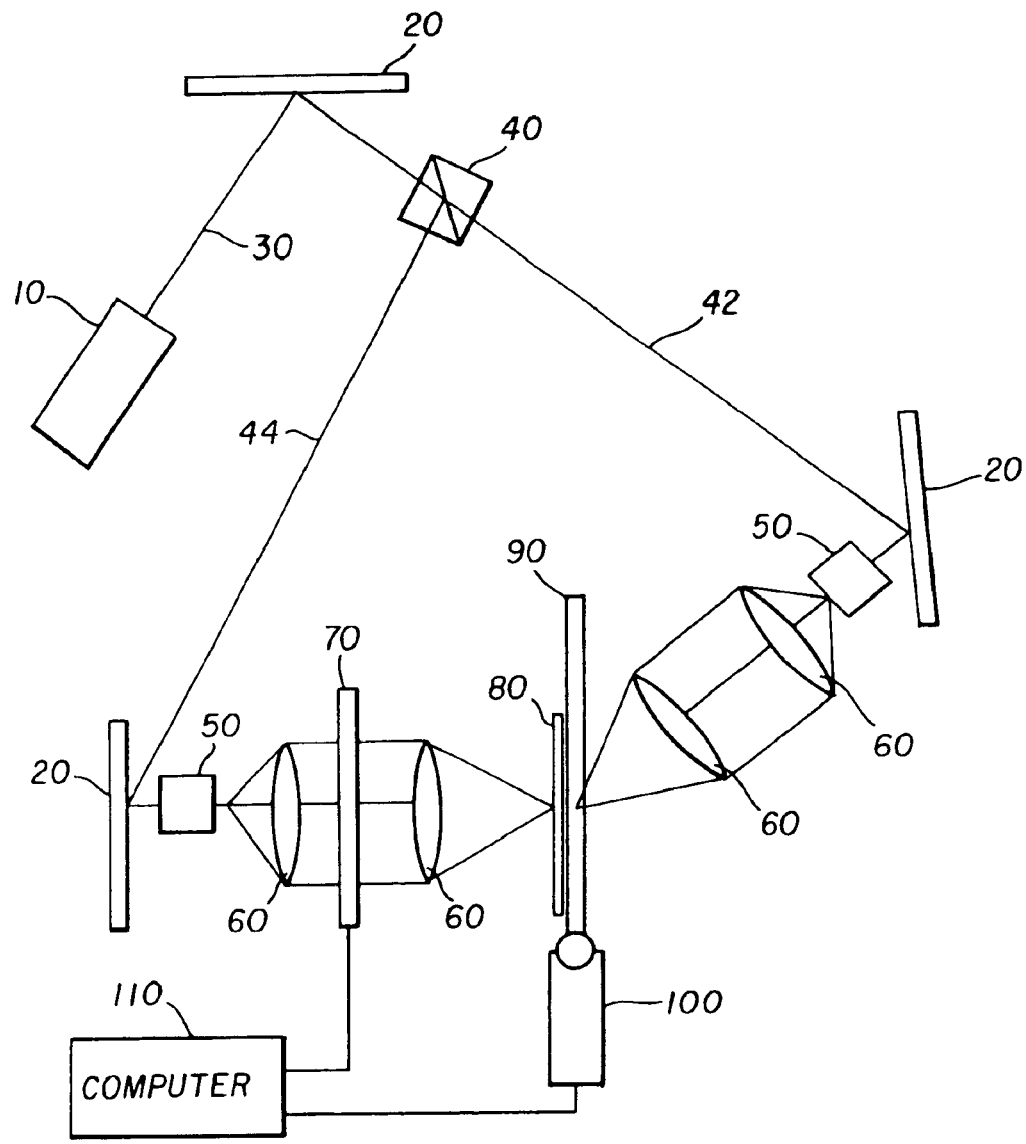
FIG. 1 is a view of a prior art recording apparatus for writing line holograms.
Figure 2:
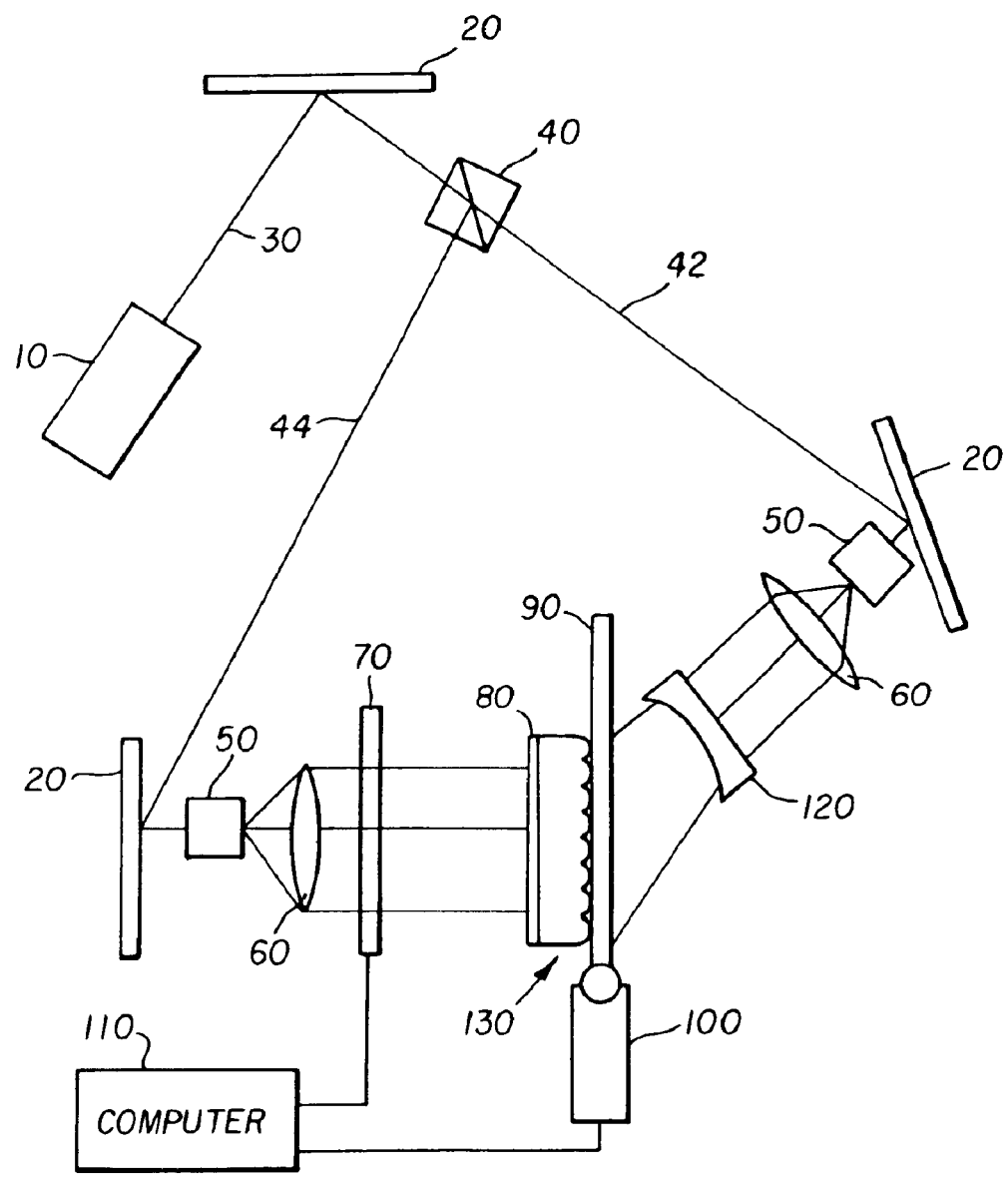
FIG. 2 is a view of a recording apparatus of the invention.

Referring to FIG. 2 in the apparatus of the present invention, a reference beam 42 is collimated and expanded by lenses 60 and 120 to cover the region of the holographic recording medium 90 which the object beam 44 will cover. The object beam 44, after passing through spatial filter 50, is collimated through lens 60 and passed through the pixilated light modulator 70. The pixilated light modulator 70 may be either an electronic display, such as a liquid crystal display, or a transparency. The modulated object beam impinges on a diffuser 80. The light passing thorough the diffuser 80, is collected by the cylindrical lenses of the lenticular array 130, and is directed to the holographic recording medium 90. The lenticular array 130 may be formed as an integral array of lenses, or as separate abutted lenses or groups of lenses. The reference beam 42 and object beam 44 then interfere in the holographic recording medium 90 located at a recording plane. The resulting interference patterns are recorded in the holographic recording medium 90.

The pixellated light modulator 70 may only record a portion of the entire dynamic image at one time. In this case, the holographic recording medium 90 is translated using the linear translation stage 100 to locate an unrecorded portion of the recording medium in the recording plane and the exposure process is repeated until the dynamic image is fully recorded. The holographic recording medium is then developed if necessary.

Figure 3:
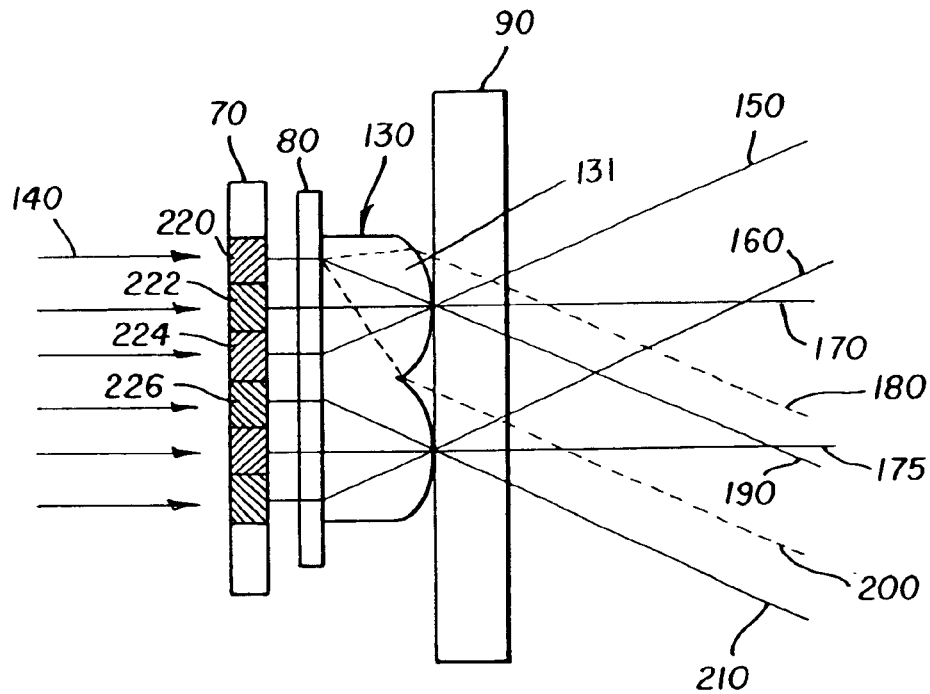
FIG. 3 is a schematic diagram illustrating the recording region in an apparatus of the invention showing 2 lenses and 6 pixels on an image modulation device.

Referring to FIG. 3, a simplified diagram of a portion of the lenslet light modulator is shown. Only two of the cylindrical lenses making up the lenticular array 130 and a portion of the pixilated light modulator 70 are shown. In this embodiment, three pixels are associated with each cylindrical lens. Collimated coherent light 140 passing through pixel 220 of pixilated light modulator is diffused and collimated by a cylindrical lens 131 of array 130 to yield light rays 180, 190, 200. Light ray 190 is the light passing through the center exit from the cylinder lens. Rays 180 and 200 are the extremes and are parallel to ray 190. Actually there are a continuum of parallel light rays between 180 and 200 emanating from pixel 220.

For the next pixel 222 in the pixilated light modulator 70, the light rays comes though the medium at different angles and are recorded as such. Here we show only light ray 170 which goes through the center exit of the first cylindrical lens. The light ray 150 is from the next pixel 224 of the pixellated light modulator 70 is at another angle. Light ray 210 from the next pixel 226 of the pixilated light modulator comes from the second cylinder lens and is parallel to rays 180, 190, and 200. Light ray 210 corresponds to the second image line of the image which is to be recorded at that desired angle. Light ray 175 corresponds to the second line of the image which has light ray 170 as the first line. Finally, light ray 160 corresponds to the second line of the image which has light ray 150 as the first line. Note that these images are recorded at three different angles. To generate the complete dynamic image, the translation is accomplished such that each group of lines are contiguous.

Figure 4:
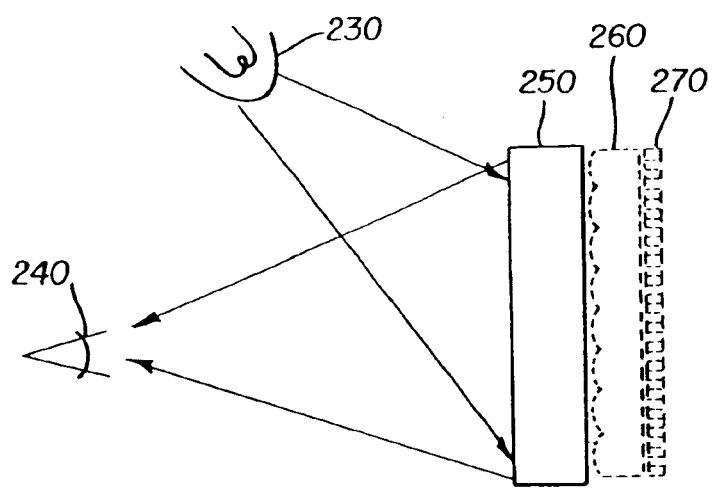
FIG. 4 is a schematic diagram illustrating the viewing of a dynamic image hologram of the invention.

FIG. 4 shows what a viewer's eye 240 would see using an incoherent light source 230 at the same angle to the recording medium 250 as the original reference beam. The viewer's eye 240 would see the image of a virtual lenticular material 260 with a virtual image of the pixilated light modulator 270 behind it. It would appear to the viewer that at different angles there were different images just as in a normal hologram or a lenticular image.

The cylindrical lenses 131 will all have focal points located at the diffuser 80. The diffuser 80 may be integral to the pixellated light modulator 70 if the modulator has some light diffusion or it could be a separate diffuser element 80 as illustrated in FIG. 2. It is recognized that if a diffuser is present against the lenticular array 130 and if collimated light is used to expose the pixilated light modulator (LCD display), then the image modulator can be remote from the recording medium.

In another embodiment, a two dimensional lenslet array (e.g. an array of pillow lenslets) can be used instead of a lenticular array. In this case multiple points are exposed with multiple angles in two orthogonal directions in the plane of the recording medium. Such an arrangement can be used for example to create a dynamic image that can display both motion and depth.

The pixellated light modulator may be either transmissive or reflective. In the case of a reflective display the collimated light must be reflected and then transmitted to the diffuser to effect the modulation. The modulator may also be monochrome or polychrome as long as it is capable of modulating the object beams radiation.

The holographic recording medium can be monochrome for use with a single wavelength or polychrome for use with multiple laser wavelengths. The polychrome recording medium can be exposed either simultaneously or sequentially with the multiple wavelengths of light. A color image modulator can be used to simultaneously expose the recording medium to multiple wavelengths of light, thereby reducing manufacture time. A monochrome image modulator may be used for increased resolution using sequential exposures of different wavelengths of light. Preferred monochrome colors can be obtained by controllably shrinking or expanding the recording material during development. In this process, a color shift is obtained by changing the spacing of the recorded interference pattern and hence the wavelength of the virtual image color upon viewing.

The holographic recording medium can be a silver halide based material, chromated gelatin or a material such as DuPont dry holographic material described in U.S. Pat. No. 4,959,284 issued Sep. 25, 1990 to Smothers et al., and U.S. Pat. No. 5,236,808 issued Aug. 17, 1993 to Smothers. All that is required is that a photosensitive material record the interference pattern generated in such a way that the phase information is preserved allowing regeneration of the image when irradiated.

The invention has been described in detail with particular reference to certain preferred embodiments thereof, but it will be understood that variations and modifications can be effected within the spirit and scope of the invention.

PARTS LIST

- 10 laser
- 20 mirror
- 30 laser beam
- 40 beam splitter
- 42 reference beam
- 44 object beam
- 50 spatial filter
- 60 cylindrical lens
- 70 pixilated light modulator
- 80 diffuser
- 90 holographic recording medium
- 100 linear translation stage
- 110 computer
- 120 lens
- 130 lenticular array
- 131 cylindrical lens
- 140 collimated coherent light
- 150 light ray
- 160 light ray
- 170 light ray
- 175 light ray
- 180 light ray
- 190 light ray
- 200 light ray
- 210 light ray
- 220 pixel 1 of pixilated light modulator
- 222 next pixel
- 224 next pixel
- 226 next pixel
- 230 incoherent light source
- 240 viewer's eye
- 250 recorded hologram
- 260 virtual lenticular material
- 270 virtual image of the pixilated light modulator image

What is claimed is:

1. Apparatus for generating a dynamic image, comprising:
   a) a laser light source for generating a coherent beam of light;
   b) optics for separating the light beam into a reference beam and an object beam;
   c) a lenslet light modulator, including an array of lenslets and a pixilated light modulator having a plurality of light modulating pixels associated with each lenslet in the array, the lenslet light modulator being located to modulate the object beam;
   d) image processing electronics for driving the lenslet light modulator with dynamic image data to produce a dynamic image at a recording plane, the recording plane being disposed adjacent the lenslet array; and
   e) optics for interfering the dynamic image and the reference beam at the recording plane to produce a hologram of the dynamic image in a holographic recording medium located in the recording plane.

2. The apparatus claimed in claim 1, wherein the lenslet array is an array of cylindrical lenses.

3. The apparatus claimed in claim 1, wherein the lenslet array is a two dimensional array of spherical or aspherical lenses.

4. The apparatus claimed in claim 1, wherein the lenslet light modulator produces a portion of a dynamic image and further comprising means for translating the recording medium relative to the lenslet light modulator to record contiguous portions of the dynamic image in the recording medium.

5. The apparatus claimed in claim 1, wherein the lenslet light modulator includes a diffuser located adjacent the lenslet array.

6. The apparatus claimed in claim 1, wherein the laser light source is capable of generating a plurality of colors of light for recording a dynamic color image in a color holographic recording medium.

7. The apparatus claimed in claim 6, wherein the lenslet light modulator is a color light modulator.

8. A method for making a dynamic image article, comprising the steps of:
   a) providing apparatus having,
      i) a laser light source for generating a coherent beam of light;
      ii) optics for separating the light beam into a reference beam and an object beam;
      iii) a lenslet light modulator, including an array of lenslets and a pixilated light modulator having a plurality of light modulating pixels associated with each lenslet in the array, the lenslet light modulator being located to modulate the object beam;
      iv) image processing electronics for driving the lenslet light modulator with dynamic image data to produce a dynamic image at a recording plane, the recording plane being disposed adjacent the lenslet array;
      v) optics for interfering the dynamic image and the reference beam at the recording plane to produce a hologram of the dynamic image in a holographic recording medium located in the recording plane;
   b) exposing the holographic recording medium with the apparatus; and
   c) developing the holographic recording medium to produce the dynamic image article.

9. The method claimed in claim 8, wherein the lenslet array is an array of cylindrical lenses.

10. The method claimed in claim 8, wherein the lenslet array is a two dimensional array of spherical or aspherical lenses.

11. The method claimed in claim 8, wherein the lenslet light modulator produces a portion of a dynamic image and further comprising means for translating the recording medium relative to the lenslet light modulator to record contiguous portions of the dynamic image in the recording medium.

12. The method claimed in claim 8, wherein the lenslet light modulator includes a diffuser located adjacent the lenslet array.

13. The method claimed in claim 8, wherein the laser light source is capable of generating a plurality of colors of light for recording a dynamic color image in a color holographic recording medium.

14. The method claimed in claim 13, wherein the lenslet light modulator is a color light modulator.

15. A dynamic image article produced by the method of claim 8.

16. The article claimed in claim 15, wherein the dynamic image is a motion dynamic image.

17. The article claimed in claim 15, wherein the dynamic image is a depth dynamic image.

18. The article claimed in claim 15, wherein the dynamic image is a multiple scene dynamic image.

19. The article claimed in claim 15, wherein the dynamic image is an optical element.

20. The article claimed in claim 19, wherein the optical element is a directional color filter 21. The article claimed in claim 19, wherein the optical element is a lens.

* * * * *